March 13, 1956  G. O. KIMMELL  2,737,973
LIQUID LEVEL CONTROL SYSTEM
Filed Dec. 16, 1952
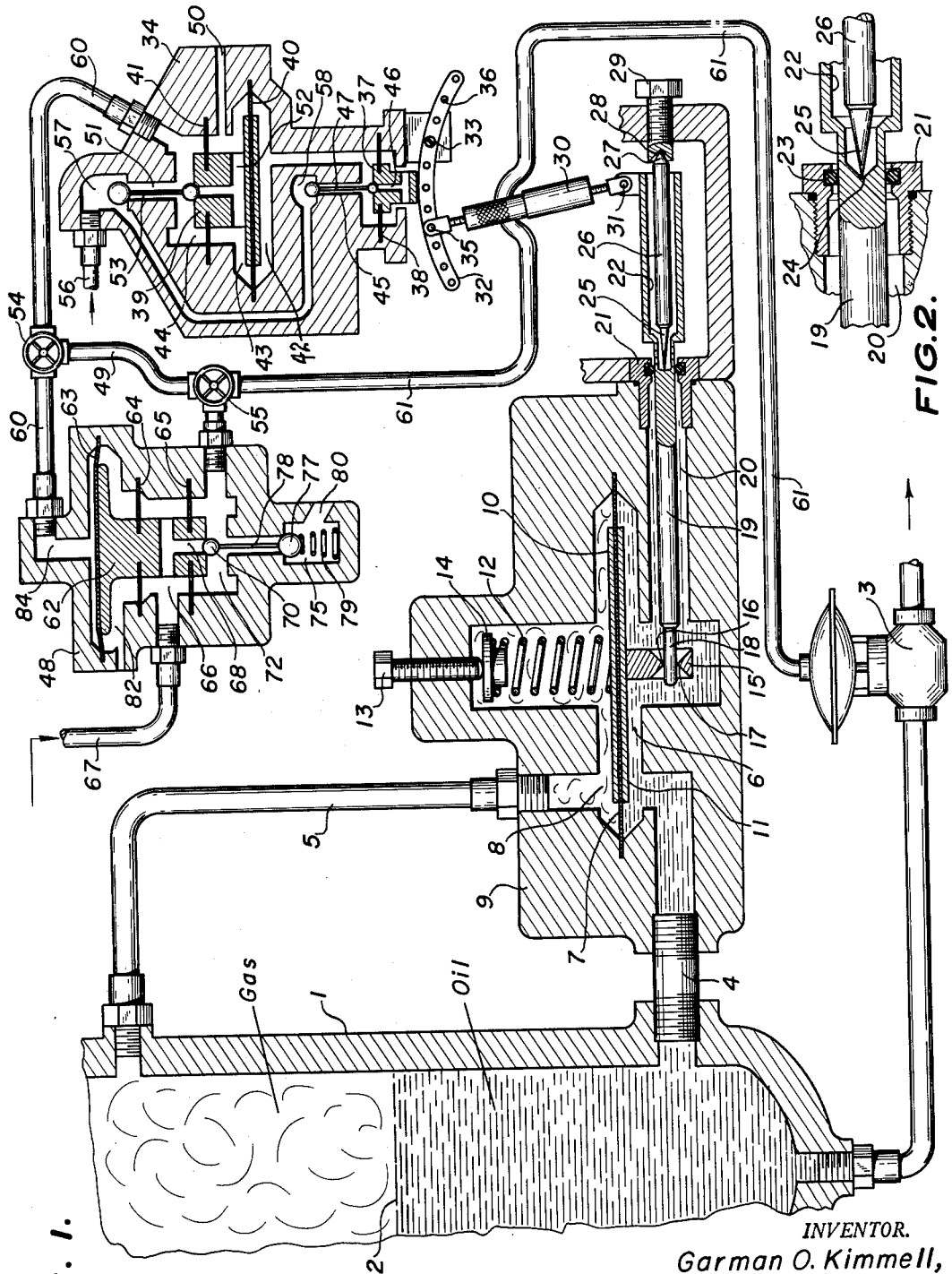
INVENTOR.
Garman O. Kimmell,
BY Earl Babcock,
ATTORNEY.

United States Patent Office 2,737,973
Patented Mar. 13, 1956

2,737,973

LIQUID LEVEL CONTROL SYSTEM

Garman O. Kimmell, Oklahoma City, Okla.

Application December 16, 1952, Serial No. 326,245

6 Claims. (Cl. 137—407)

This invention relates to liquid level or differential control systems, and more particularly to close and sensitive control systems operating at moderate or high pressures.

One object of the invention is to provide a system for the control of liquid level in a vessel in which there is no necessity for floats or float chambers and in which only small external connections to the vessel are required.

Another object of the invention is to provide a system which is extremely sensitive to changes in liquid level, either between liquid and vapor, or between two immiscible liquids of only slightly different densities.

A further object of the invention is to provide a system which is extremely sensitive to small differential pressure changes occurring at moderate to high pressures.

An important object of the invention is to provide a liquid level or differential control system in which the pressure barrier between the inside and outside of a vessel containing a liquid, the level of which is to be controlled, is such that the full energy provided by the liquid level or differential change is available to pilot means outside the vessel.

A still further object of the invention is to provide an improved liquid level or differential control system in which various elements cooperate in a novel way to provide a comparatively trouble free and accurate arrangement, and one which is not limited in its range of application and operation to any mechanism associated with a float or float chamber; the system being able to operate over a wider range of liquid level position than in float driven mechanisms where the limits of the range of operation are defined by the extreme positions of and vertical displacement of the float.

With the preceding and other objects in mind, the invention resides in the combination and arrangement of parts and in the details of construction described and claimed.

In the drawings, wherein like numerals of reference designate corresponding parts:

Figure 1 is a vertical cross-sectional view of a typical system designed to carry out the invention; and Figure 2 is an enlarged vertical cross section of the waggle arm of the system of Figure 1, showing the barrier in the vessel under pressure and the end force restraining pivot.

Referring in detail to the drawing, 1 designates a vessel under pressure in which it is desired to control the liquid level 2. It will be understood that means not shown supplies fluid to the vessel 1.

A pneumatic motor valve of conventional design is shown at 3. The opening and closing of this motor valve permits liquid to be removed from or retained in the vessel 1 to maintain the liquid level 2.

In accordance with the present invention, the motor valve 3 may be either spring-opening and pressure-closing or vice versa and it may be so operated as to throttle flow of liquid from the vessel 1 and thus maintain the desired liquid level 2 while fluids are being supplied to the vessel, or it may be operated to snap open or closed. The particular arrangement for causing interruption or snapping is claimed in a divisional application Serial No. 326,246, filed on even date herewith. If the valve 3, instead of throttling, snaps fully open and fully closed intermittently to control the liquid level 2, the vessel 1 is more readily scavenged of sand, sludge and the like, and there is less abrasion on the parts of the valve 3.

Attachment of the control system to the vessel 1 is accomplished by a nipple 4 and a conductor pipe 5. A diaphragm 7 is mounted and sealed within a housing 9 and thus provides two chambers 6 and 8. The nipple 4 provides a communication between the oil or other liquid in the vessel 1 and a chamber 6 beneath a diaphragm 7. The pipe 5 provides communication between the gas or other fluid in the vessel 1 and the chamber 8. Diaphragm 7 is re-enforced centrally by a pair of plates 10 and 11 disposed on either side of the diaphragm to form an assembly. The diaphragm assembly 7, 10, 11 is variably loaded by a spring 12 through a sealed adjusting screw 13, and a spring rocker plate 14.

Attached to the diaphragm plate 11 is a fulcrum piece 15 in which is formed knife edges 16 and 17 in close proximity to the reduced end 18 of a cylindrical waggle arm 19. The waggle arm 19 extends radially through a hole 20 in the housing 9 and through a stuffing box 21 which serves as a pressure barrier. The reduced end 18 of the waggle arm 19 is thus coupled to the diaphragm assembly 7, 10, 11 so as to move up and down with it, while being free to move longitudinally in the knife edges 16 and 17 and free to rotate in these knife edges. There is thus a minimum of friction in this coupling.

The outer end of the waggle arm 19 has an enlarged hollow portion 22. This portion 22 is outside of the stuffing box 21 and is simply an open ended tube as shown. Within the stuffing box 21 is disposed a sealing medium in the form of an O ring 23. Clearance is provided in the vicinity of the O ring 23 for permitting the waggle arm 19 not only to wag therein but also to rotate and move horizontally therein.

The hollow portion of the waggle arm 19 terminates in a conical seat 24 (see Figure 2) which engages a pivot point 25 of a thrust rod 26. The entire rod 19 is thus free to wag and rotate about the pivot point 25 but it cannot move horizontally outwardly if the pivot point 25 is held against outward movement by the thrust rod 26. The thrust rod 26 may have in addition to the pivot point 25, a pivot point 27 (see Figure 1) on the opposite end bearing in a cone 28 of an adjusting screw 29. Thus the thrust rod 26 supports the pivot point 25 in such a manner that it is radially yieldable slightly so that the O ring 23 can function to best advantage. The adjusting screw 29 is used to position the pivot point 25 at the center of the circle of the sealing medium 23. With this pivoting and thrust-taking arrangement inside the waggle arm 19, there is practically no force couple in the vicinity of the stuffing box 21 and hence, there is a minimum of interference with sensitive operation of the system.

It will be observed that the vertical motion of the diaphragm 7 does not tend to move the rod 19 outwardly of the housing 9, but the fluid pressure therein does tend to force the rod 19 outwardly. The pivot point 25 serves two functions. It permits the rod 19 to wag freely and it also serves as a thrust-taking arrangement in that it exerts a reaction force on the rod 19 in opposition to the fluid pressure in the chamber 6 of the housing 9.

The outer end of the waggle arm 19 is attached to an adjustable link or turnbuckle 30 by a hinge pin 31. A lever arm 32 is pivotally attached by fulcrum pin 33 to pilot means acting as a force translator and pressure multiplier, or booster, the housing of which is shown in cross-section at 34. The arm 32 is in the shape of an arc of a circle with the pin 31 as its center. A pin 35 on the upper end of link 30 can engage any of the holes 36 in the arm 32 so that the arm 32 can be made to serve as any one of the three classes of levers.

Resting on the arm 32 is a diaphragm plate assembly 37 clamping the inside margin of a diaphragm 38, the outer margin of which is mounted in the lower portion of housing 34. Above this diaphragm plate assembly 39 is a double diaphragm plate assembly 39 clamping the inside margins of a large diaphragm 40 and a small diaphragm 41, the outside margins of which are also mounted in housing 34.

Thus diaphragms 38, 40, and 41 form chambers 42, 43, and 44 in the housing 34. Chamber 42 is defined by diaphragm 38, diaphragm 40, and the housing 34 and has a vertical supply port 45 within the housing 34 and a vent port 46 through the diaphragm plate assembly 37. A double valving element 47 consisting of two balls connected by a rod, simultaneously engages a valve seat in the supply port 45 and a valve seat in the vent port 46 when the diaphragm plate assembly 37 is in its neutral position, as shown in Figure 1.

Chamber 43 is defined by diaphragm 40, diaphragm 41, and housing 34 and is always connected to atmosphere through a radial port 50 in housing 34.

Chamber 44 is defined by diaphragm 41 and housing 34 and has a vertical supply port 51 within the housing 34 and an axial vent port 52 through the assembly 39. A double valving element 53 similar in shape to the element 47, simultaneously engages a valve seat in the supply port 51 and a valve seat in the vent port 52 when the double diaphragm plate assembly 39 is in its neutral position. A pilot supply line 56 is attached to housing 34 to feed pilot supply gas under pressure to chambers 57 and 58 above the valving elements 53 and 47 respectively.

A tube 60 is shown connecting chamber 44 with a pressure interrupter or snapper, the housing of which is shown in cross-section at 48. If it is desired to have the motor valve 3 throttle to control the liquid level 2 in the vessel 1, the tube 60 is connected directly to the tube 61 and the snapper 48 is eliminated from the system. A tube 49 having valves 54 and 55 is provided to completely disconnect and by-pass the snapper 48 when desired. Under certain conditions of operation, as for example the handling of liquids which contain sand or sludge or other material which is sluggish or which may tend to abrade the valve elements of pneumatic motor valve 3, it is advantageous to operate the system in an off-on or snap-action fashion. When this is indicated, by simply changing valves 54 and 55 the pressure interrupter or snapper 48 is interposed in the communication means between chamber 44 and pneumatic motor valve 3. The operation of the system is described hereinafter both with and without the snapper 48.

As to the construction of the snapper 48, it will be seen that there is disposed within the housing a vertically moving assembly 62. The upper end of assembly 62 terminates in a diaphragm 63, the area of which depends upon what pressure snapping range is desired. The inside margins of two smaller diaphragms 64 and 65 are clamped by assembly 62 in spaced relation. The peripheral margins of diaphragms 64 and 65 are clamped in the housing 48 to form a cylindrically shaped chamber 66. The inside diameter of housing 48 at the point of clamping of diaphragm 64 is slightly larger than at the point of clamping of diaphragm 65. Booster or pilot supply fluid may enter chamber 66 from a supply pipe 67. The same source (not shown) which supplies the pilot gas to chambers 57 and 58 of the housing 34 may be used to supply gas to chamber 66.

Transversely through assembly 62 at a point between diaphragms 64 and 65 is a T-shaped discharge passage 68 for the chamber 66. A spherical valve plug 70 is capable of opening and closing this passage 68.

Within housing 48 and below diaphragm 65 there is formed a chamber 72. The action of valve 70 against its seat controls the flow of pilot supply fluid from chamber 66 to chamber 72. When the snapper is used, tube 61 is connected to chamber 72 and leads to the control valve 3. Chamber 72 is also provided with a port extending into a lower chamber 75. A spherical valve plug 77 opens or closes the port between chamber 72 and chamber 75. A valve stem 78 extends through this port and ties valve plugs 70 and 77 together.

Stem 78 is of such length that when both valves 70 and 77 are seated, the assembly 62 is in neutral position, with each of the diaphragms 64 and 65 lying essentially in a plane as shown. A spring 79 bears against the bottom of chamber 75 and engages the valve plug 77 to hold it against its seat with sufficient force to prevent the pilot supply pressure in chamber 72 from opening it.

A downward load on assembly 62 can overcome spring 79 and open valve 77, the force from the assembly 62 being transmitted by stem 78. It will be seen that the structure is such that valve 77 can be held open only while valve 70 remains closed. Whenever valve 77 is off of its seat, the spring 79 is exerting a force tending to keep valve 70 closed.

When valve 77 is open, chamber 75 is vented to atmosphere through passage 80.

The chamber 82 between diaphragms 63 and 64 is connected to the atmosphere. The chamber 84 above the diaphragm 63 is connected to the tube 60.

The function of the booster 34 is to increase the power transmitted to it from the liquid level responsive means 9 and to convert the mechanical movement imparted to it from the means 9, through the link 30, into pneumatic power to operate either the control valve 3 directly, as a throttle, or to operate the snapper 48 which then in turn operates the control valve 3 with intermittent or snapping action. The snapper 48 does not function to boost the power. Its function is to convert a varying pneumatic pressure into an intermittent pressure, the time period of which varies under the control of variations of the pneumatic pressure applied to it from booster 34.

In explaining the operation of the device, it may be assumed that the valve 3 has a spring-opening pressure-closing motor and that the link 30 is connected to the arm 32 at the point shown on the drawing. If the pin connection 35 between the link 30 and the arm 32 were on the right-hand side (as viewed in Figure 1) of the fulcrum pin 33, the action between the waggle arm 19 and the booster 34 would, of course, be the opposite of that described hereinafter.

Assume also that the spring 12 is so adjusted that the force it exerts on diaphragm 7 is balanced by the total pressure exerted in chamber 6 on the diaphragm 7 by the desired head of oil in vessel 1, represented by the liquid level 2, plus an upward force exerted by the end 18 of the waggle arm 19 against the knife edge 16 of the dependent fulcrum piece 15 due to pilot pressure in booster 34. In this equilibrium condition the force applied to diaphragm 7 by the spring 12, minus the force applied at knife edge 16, is equal to the differential density of the oil and gas in vessel 1, multiplied by the product of the head of liquid level 2 above diaphragm 7 and the effective area of diaphragm 7. It can be seen that the float equivalent of diaphragm 7 would be one of cross sectional area, at the liquid level 2, equal to the effective area of diaphragm 7. The float equivalent would be limited in control by its vertical displacement plus its vertical movement.

In this equilibrium condition also, the waggle arm 19 is in a nearly axial position in the hole 20 in the housing 9. The lever arm 32 is contacting diaphragm plate assembly 37 so that the double valving element 47 is contacting both its seats. Chamber 42 is then under a pressure intermediate between pilot supply pressure at 58 and atmospheric pressure in chamber 43. This pressure in chamber 42, acting on diaphragm 38, loads lever arm 32, and this causes the end of waggle arm 19 to exert an upward force against knife edge 16.

The double diaphragm plate assembly 39 is then in such position as to have established pneumatic balance in chambers 42 and 44. Balance in chambers 42 and 44 occurs when the product of the pressure in chamber 42 and the effective area of diaphragm 40 is equal to the product of the pressure in chamber 44 and the effective area of diaphragm 41. Tube 60 is under the pressure of chamber 44, so that if it is connected directly to the spring-opening, pressure-closing pneumatic motor valve 3, the valve 3 is partially open and passing liquid from vessel 1 at approximately the same rate that liquid is entering.

On any rise of the liquid level 2 in vessel 1, the assembly 10 is moved in an upward direction against the force of spring 12 permitting the end 18 of the waggle arm 19 to follow.

Working back through the linkage, the slightest upward movement of the end 18 of the waggle arm 19 will produce a leak or slight venting of gas from chamber 42 through passage 46, the upper ball of valve 47 remaining seated. A drop in pressure in chamber 42 reduces the force acting on diaphragm plate assembly 37, which reduced force is translated through the link 30 and reduces the load acting on knife edge 16. Reduction of force against knife edge 16 permits spring 12 to reposition the assembly 10 which repositioning, reflected back through the linkage, interrupts the leak or slight venting through passage 46 and a new set of equilibrium conditions is established.

The reduction in pressure in chamber 42 also forces an adjustment in the equilibrium conditions of chambers 42 and 44.

A lowering of the pressure in chamber 42 lowers the pressure in chamber 44 an exaggerated amount, the exaggeration being in exact relation to the relative effective areas of diaphragms 40 and 41. This is brought about by the fact that when diaphragm plate assembly 39 is lowered, the lower ball of valve 53 leaves its seat and allows bleeding of the gas from chamber 44 to atmosphere through passages 52 and 50. If tube 60 is connected directly to tube 61, the reduced pressure in chamber 44 is communicated to the spring-opening pressure-closing motor valve 3 to increase the flow of liquid from vessel 1.

A lowering of the liquid level 2 in vessel 1 produces a process in reverse of the foregoing. The assembly 10 moves downwardly causing the diaphragm plate assembly 37 of the booster 34 to raise which forces the upper ball of valve 47 to open and allow pilot gas to enter chamber 42 and raise the pressure therein. This elevates the pressure in chamber 44 since the increased pressure in chamber 42 causes the assembly 39 to be lifted in response to the pressure on the large area of diaphragm 40 which causes the valve 53 to close passage 52 and open passage 51 allowing pilot gas from chamber 57 to enter chamber 44. The elevated pressure in chamber 44 is communicated through tubes 60 directly to tube 61, to the spring-opening pressure-closing motor valve 3 to restrict the flow of liquid from vessel 1.

Thus it is seen that the position of the liquid level 2 produces changes in pressure in chamber 44, the pressure in chamber 44 being a close function of the position of the liquid level 2. In any conventional form of the motor valve 3, the valve position is a function of the pressure applied to its diaphragm motor.

The use of a motor valve 3 establishes another relationship between the position of motor valve 3 with the position of the liquid level 2 in vessel 1. This relationship is usually referred to as throttling range. In any throttling device of the character described, it is desirable to be able to change the throttling range to fit the flow conditions of liquid through the vessel 1. With the apparatus shown, variation of throttling range is easily accomplished by adjusting the pin 35 in the various holes 36 of lever arm 32, to change the mechanical linkage between pin 31 and the contact of diaphragm plate assembly 37 to lever arm 32.

In the operation of the system as described thus far, it has been assumed that the tube 60 was connected directly to the tube 61, so that the snapper 48 was bypassed by the tube 49.

If the snapper 48 is included in the system, it will be clear that the liquid level responsive means 9, the booster 34 and the connecting parts operate just the same as heretofore described, but that the control valve 3 will operate differently. In the arrangement illustrated, the snapper 48 is so constructed as to operate a spring-closing and pressure-opening control valve 3. A description of the action of the means 9 and the booster 34 will not be repeated, therefore, but the action of the snapper in response to variations in pneumatic pressure in the tube 60 will be described.

If there were no pressure in chamber 84, the pilot gas under pressure in chamber 66 would force the assembly 62 into its upward position due to the fact that diaphragm 64 is larger than diaphragm 65 and hence has a greater effective area exposed to the pilot gas pressure.

To start with then, let it be assumed that the level of liquid in the tank 1 is high, so that the assembly 10 in the control means 9 is up and so that the chambers 42 and 44 of booster 34 are open to the atmosphere through passages 46 and 52 respectively.

As the assembly 62 rises, it disengages valve 70 from its seat and permits pilot gas to enter chamber 72 and tube 61 to open control valve 3. Spring 79 holds valve 77 in contact with its seat against the pressure of the pilot gas. The pressure in chamber 72 nullifies diaphragm 65 by equalizing the pressure across it to establish and hold the assembly 62 in the upward position. As the open control valve 3 permits the liquid level 2 in vessel 1 to lower, the pressure in tube 60 soon rises, and when this happens, pressure increases in chamber 84 and assembly 62 is downwardly loaded against the pressure acting upwardly on diaphragm 64. Finally a point of loading occurs at which valve 70 just contacts its seat. At this point of contact, supply fluid is cut off from chamber 72, and a balance exists in which the product of the pressure in chamber 84 and the effective area of diaphragm 63 is equal to the product of the pressure in chamber 66 and the effective area of diaphragm 64; diaphragm 65 having the same pressure exposed to both sides and not contributing to the balance.

However, the assembly 62 then hesitates. It does not continue to move on downwardly until an additional force is exerted upon it. Until the downward load on assembly 62 is increased sufficiently to compress the spring 79 acting upwardly on valve 77 at this time, assembly 62 remains at the position where valve 70 is on its seat and valve 77 is on its seat.

The slightest addition of load on assembly 62 to that loaded condition last described initiates a flow through valve 77. With the pilot supply fluid cut off at valve 70, pressure starts to drop in chamber 72 and initiation of the pressure drop immediately sets up an unbalance.

Assembly 62 then snaps rapidly to a downward position, reducing the pressure in chamber 72 and tube 61 to atmospheric.

With chamber 72 and chamber 82 both at atmospheric pressure, supply fluid is acting only on the difference in effective areas of diaphragms 64 and 65 to oppose the downward force on assembly 62.

With the pressure removed from control valve 3, it closes, and the liquid level in vessel 1 rises until pressure is reduced in tube 60, reducing the downward load on assembly 62. When the force acting downwardly on assembly 62 is reduced to the value of the product of the pilot gas supply pressure and difference in effective areas of diaphragms 64 and 65, plus the upward force of spring 79, valve 77 contacts its seat to interrupt the communication of chamber 72 to atmosphere.

But again the assembly 62 hesitates and moves no further until an additional force is exerted upon it. Until the downward force on assembly 62 is further reduced, spring 79, which is now acting on both valves 77 and 70 due to the downward position of assembly 62, prevents pilot gas from entering chamber 72 and exerting an upward force on diaphragm 65.

When the downward force on assembly 62 is reduced beyond that value last described, flow is initiated through valve 70 to elevate the pressure in chamber 72 and initiation of the pressure rise immediately sets up an unbalance. Assembly 62 then snaps to its upward position and causes the pressure in chamber 72 to build up to the pressure of the supply fluid, thus completing the cycle of operation.

In order to maintain a proper line of division, the present application is directed to the overall combination of the elements shown and described and to the specific structure of the liquid level responsive means 9, the latter being deemed of general application. In the companion application filed on even date herewith, Serial No. 326,246, the claims are directed to the structure of the snapper 48.

While only one embodiment has been shown and described herein, it is obvious that various changes may be made without departing from the spirit of the invention or the scope of the annexed claims.

I claim:

1. In a system consisting of a vessel having a liquid and a fluid of a different density than the liquid therein and a control valve for maintaining the interface between the liquid and the fluid at a desired level the combination with said control valve, of a differential control system consisting of a diaphragm assembly having a housing with a diaphragm mounted therein to provide two chambers, means for providing a communication between the liquid in the vessel and one of the chambers and means for providing a communication between the fluid in the vessel and the other of said chambers, a waggle arm connected to said diaphragm to be actuated thereby, said waggle arm extending through the wall of said housing, a stuffing box for said waggle arm serving as a pressure barrier, means serving as a pivoting and thrust-taking arrangement for the waggle arm, said means having a pivot point located centrally of the stuffing box, and pilot means serving as a force translator and pressure multiplier or booster connected to the control valve and to said waggle arm to be controlled by the waggle arm and actuate the control valve in response to movement of the diaphragm.

2. The combination defined in claim 1 in which the stuffing box is provided with a sealing medium in the form of an "O" ring through which the waggle arm extends and which permits the waggle arm to wag therein and also rotate and move horizontally therethrough.

3. The combination defined in claim 1 in combination with a pressure interrupter or snapper interposed between the pilot means and the control valve for causing said control valve to snap on and off intermittently.

4. In a system consisting of a vessel having a liquid and a fluid of a different density than the liquid therein and a control valve for maintaining the interface between the liquid and the fluid at a desired level the combination with said control valve, of a differential control system consisting of a diaphragm assembly having a housing with a diaphragm mounted therein to provide two chambers, means for providing a communication between the liquid in the vessel and one of said chambers and means for providing a communication between the fluid in the vessel and the other of said chambers, a waggle arm having means associated therewith for pivoting it in the wall of said housing and having its inner end coupled to said diaphragm to be actuated thereby, pilot means serving as a force translator and pressure multiplier or booster connected to the outer end of said waggle arm, a pressure interrupter or snapper connected to said pilot means and to the control valve to be controlled by the pilot means and cause the control valve to snap open and closed intermittently in response to movement of said diaphragm and waggle arm.

5. A diaphragm assembly having a housing with a diaphragm therein providing a chamber, a waggle arm extending through the wall of the housing and having its inner portion connected to said diaphragm, a stuffing box for said waggle arm serving as a pressure barrier and means serving as a pivoting and thrust-taking arrangement for the waggle arm, said means having a pivot point located centrally of the stuffing box.

6. The assembly defined in claim 5 in which the stuffing box is provided with a sealing medium in the form of an O ring through which the waggle arm extends and which permits the waggle arm to wag therein and also rotate and move longitudinally therethrough.

References Cited in the file of this patent

UNITED STATES PATENTS

| | | |
|---|---|---|
| 492,260 | Barry | Feb. 21, 1893 |
| 1,154,591 | Dodge | Sept. 21, 1915 |
| 1,578,010 | Burke | Mar. 23, 1926 |
| 1,851,422 | Durando | Mar. 29, 1932 |
| 2,217,537 | Carlstedt | Oct. 8, 1940 |
| 2,457,320 | Rosenberger | Dec. 28, 1948 |
| 2,662,509 | Fellows | Feb. 15, 1953 |